(12) United States Patent
Patzner

(10) Patent No.: US 6,526,776 B2
(45) Date of Patent: Mar. 4, 2003

(54) METHOD AND APPLIANCE FOR COOLING

(75) Inventor: Norbert Patzner, Bad Mergentheim (DE)

(73) Assignee: H + P Technologie GmbH & Co. Gesellschaft fuer Kuehlsysteme, Bad Mergentheim (DE)

( * ) Notice: Subject to any disclaimer, the term of this patent is extended or adjusted under 35 U.S.C. 154(b) by 0 days.

(21) Appl. No.: 09/853,265

(22) Filed: May 11, 2001

(65) Prior Publication Data

US 2002/0005045 A1 Jan. 17, 2002

(30) Foreign Application Priority Data

May 13, 2000 (DE) .......................... 100 23 650

(51) Int. Cl.[7] ................................. F25B 17/00
(52) U.S. Cl. ............... 62/480; 62/101; 62/141
(58) Field of Search ............ 62/480, 476, 141, 62/101, 106, 527; 251/153

(56) References Cited

U.S. PATENT DOCUMENTS 5,477,706 A * 12/1995 Kirol et al. ............... 62/480
5,482,541 A * 1/1996 Maier-Laxhuber et al. ... 96/146
5,718,125 A * 2/1998 Pfister et al. ............. 62/527

* cited by examiner

Primary Examiner—Denise L. Esquivel
Assistant Examiner—Melvin Jones
(74) Attorney, Agent, or Firm—W. F. Fasse; W. G. Fasse

(57) ABSTRACT

A cooling method using an adsorption agent is carried out in an apparatus including at least one reactor/adsorber embodied as a vessel for receiving the adsorption agent such as zeolite, at least one evaporator vessel receiving an evaporation agent such as water, and at least one line which connects the two vessels and which can be shut off with at least one shut-off member. The reactor/adsorber and the evaporator each have at least one orifice and are selectively connectable to a vacuum generator and to at least one condenser. The selective separation and connection of individual components and/or of component groups for carrying out regeneration and adsorption cycles take place in each case in a pressure-tight or vacuum-tight manner and with air being shut off.

18 Claims, 10 Drawing Sheets

METHOD AND APPLIANCE FOR COOLING

DESCRIPTION

The invention relates to a method and an appliance for cooling with the aid of an adsorption agent, the appliance having as components at least one reactor which comprises a vessel for receiving the adsorption agent, in particular zeolite, with at least one vessel serving as an evaporator and for receiving an evaporation agent, in particular water, and with at least one line which connects the two vessels and which is capable of being shut off at least with the aid of a shut-off member, the vessel with the adsorption agent and the vessel which serves as an evaporator each having at least one orifice and being connectable to a vacuum generator.

An appliance of the type mentioned is known from EP 0 577 869 B1. It relates to a cooling system with a vacuum-tight working-medium vapor collecting line, on which a plurality of connection points for a corresponding number of cold-generating evaporators are provided. In addition, further connection points are to serve for the exchangeable connection of any further evaporators, the connection points not occupied by an evaporator being closed in a vacuum-tight manner.

Furthermore, it is known from EP 0 577 869 B1 that the vessel containing the adsorption agent has easily releasable closures which make it possible in a simple way to exchange the saturated adsorption-agent filling for a freshly regenerated filling.

The known appliance operates in a fundamentally satisfactory way. However, handling is complicated and is not entirely free of problems. The object on which the invention is based is, therefore, to improve handling and practicability and, moreover, to minimize the energy consumption of the appliance.

To achieve this object, according to the invention, the separation and connection to the components take place in each case in a pressure-tight manner and with air being shut off.

A separation of components for regenerating the adsorption agent and a connection of components for a new adsorption cycle, such that air cannot pass out of the surrounding atmosphere into the components or into the lines connecting them, allow process control in an as it were closed operating circuit. This closed operating circuit is preferably to be permanently below atmospheric pressure and then makes an appreciably energy saving possible. This applies to the vacuum required in each case between the evaporator and reactor during adsorption and also between the reactor and condenser, to be precise when a vacuum is also expedient in the condenser during desorption.

The appliance for carrying out the invention provides for the components to be connectable to one another and releasabley from one another at least partially, individually and/or in groups, in a pressure-tight or vacuum-tight manner and with air being shut off. This takes place preferably with the aid of couplings free of dead space in at least some of the lines connecting the components.

The invention is described in more detail below with reference to exemplary embodiments illustrated in a drawing in which.

Figure 1:
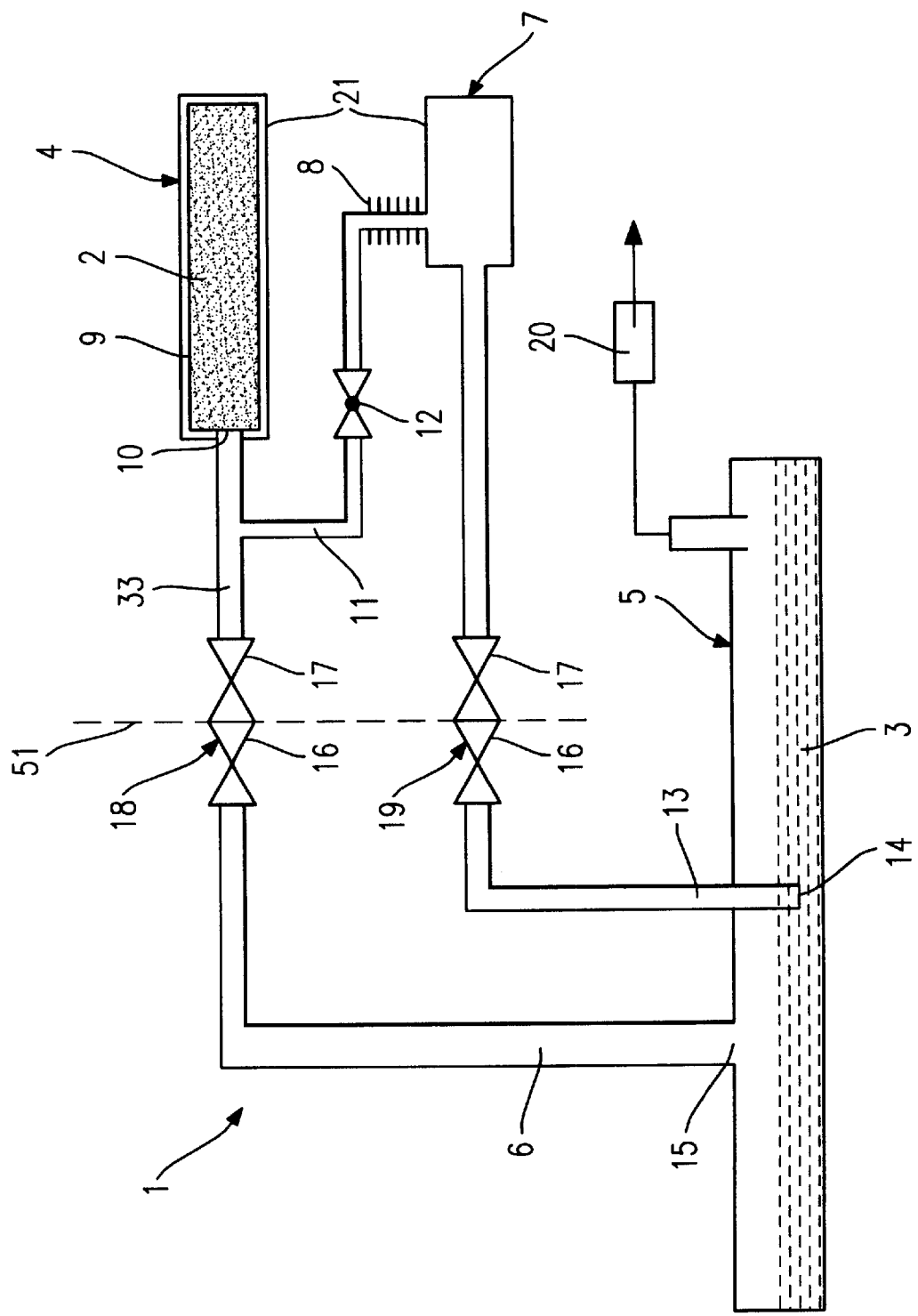
FIG. 1 shows a block diagram of the appliance.

An appliance 1 for cooling with the aid of an adsorption agent 2, such as, for example, with the aid of zeolite, and using an evaporation agent 3, such as, for example, water, comprises at least one adsorber 4 and one evaporator 5 which are connected to one another with the aid of at least one line 6 in the form of a vapor line. A further essential component of the appliance 1 is a water storage vessel 7 with an associated or integrated condenser 8 for water vapor.

The adsorption agent 2 is located in a vessel 9 which forms a reactor and has an orifice 10. The interior of the vessel 9 is connected to the water storage vessel 7 or to the condenser 8 via a line 11 in the form of a vapor line. Located in the line 11 is a nonreturn valve 12 or a device which ensures that water vapor can flow only out of the adsorber 4 into the water storage vessel 7 and its condenser 8 and not in the opposite direction.

The water storage vessel 7 is connected to the evaporator 5 via a line 13 in the form of a water line, the outlet orifice of this line expediently being located in the evaporator 5 below the water level of the latter.

Both the line 6 connected to an orifice 15 of the evaporator 5 and leading to the reactor or adsorber 4 and the line 13 each have a coupling 18 and 19 consisting of two coupling halves 16 and 17, such that the evaporator 5 can be connected to the adsorber 4 or to the water storage vessel 7 and its condenser 8 in a pressure-tight manner, and with air being shut off, and can also be separated from these in a pressure-tight manner, and with air being shut off. It is therefore possible to separate the adsorber 4 and the water storage vessel 7 together with its condenser 8, as components of the appliance 1, from the evaporator 5, while at the same time maintaining the pressures (vacuum, low pressures) prevailing in these components, and to connect them to the evaporator 5 again, for example after regeneration of the adsorption agent 2 in the adsorber 4 and after condensation of the water vapor, expelled from the adsorber 4 during desorption, in the condenser 8 of the water storage vessel 7. At the same time, the adsorber 4 and the water storage vessel 7 with its condenser 8 form a unit closed on itself, and the same basically applies to the evaporator 5 with its lines 6 and 13 leading as far as the coupling halves 16.

A vacuum generator 20 is also provided and is connected in a suitable way, for example, to the evaporator 5, as indicated diagrammatically in FIG. 1.

Figure 2:
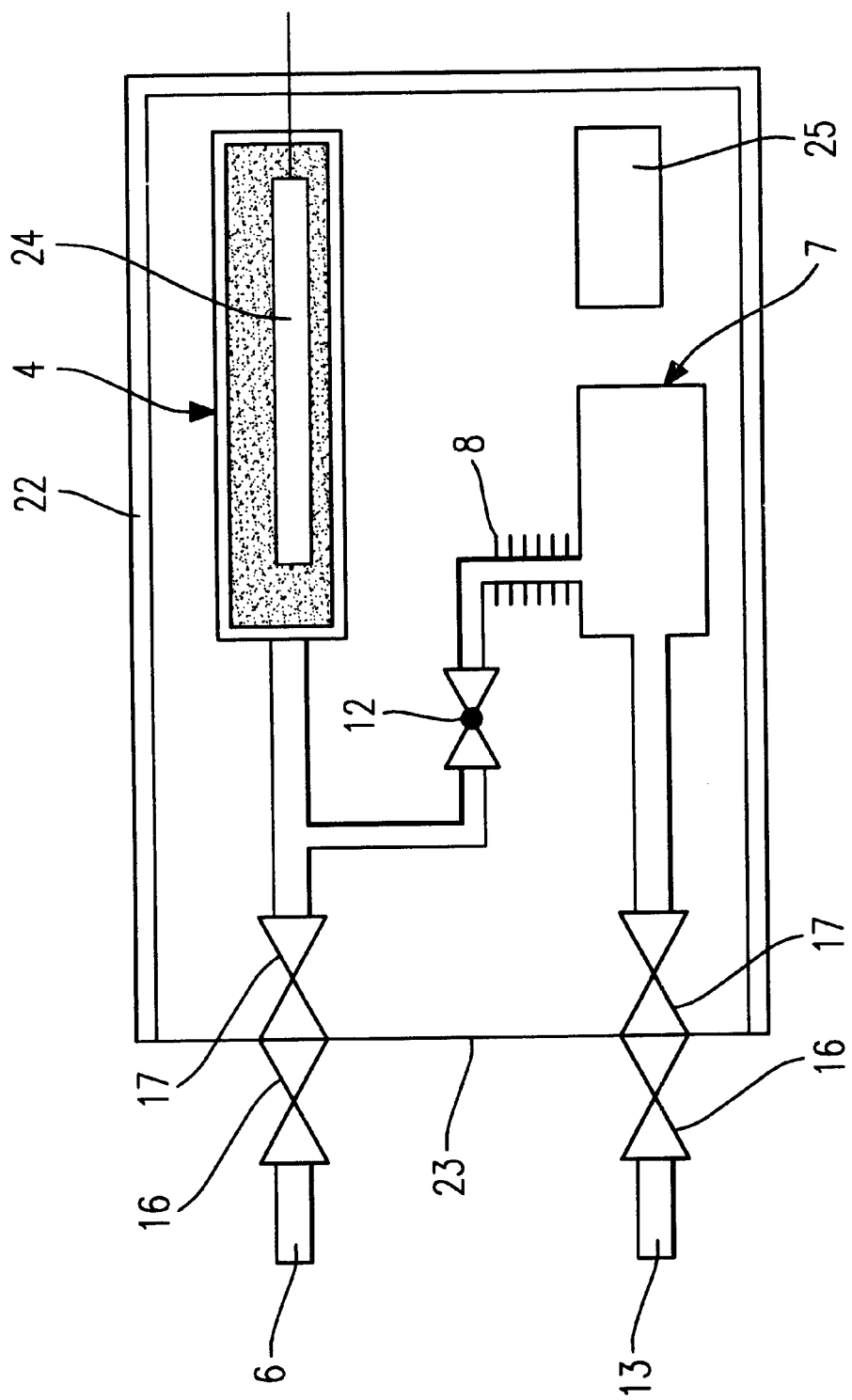
FIG. 2 shows a block diagram of components combined into a unit in the form of a cartridge, consisting of at least one adsorber and of one water storage vessel with condenser.

The components consisting of the adsorber 4 and water storage vessel 7 or condenser 8 expediently not only form a unit 21 according to FIG. 1, so as to be jointly connectable to and releasable from the evaporator 5 via couplings 18 and 19, but, according to FIG. 2, they are also expediently arranged within a housing 22 forming a cartridge. The two coupling halves 17 belonging to the adsorber 4 and the water storage vessel 7 with its condenser 8 are located on one end face 23 of the housing 22 and can be connected there to the other coupling halves 16 which belong to the lines 6 and 13.

FIG. 2 also shows that a heating system 24, for example in the form of an electrical heating system, may be assigned to the adsorber 4. Furthermore, a control device 25 for the heating system 24 may also be arranged in the housing 22 forming the cartridge, as indicated merely diagrammatically in FIG. 2.

Figure 3:
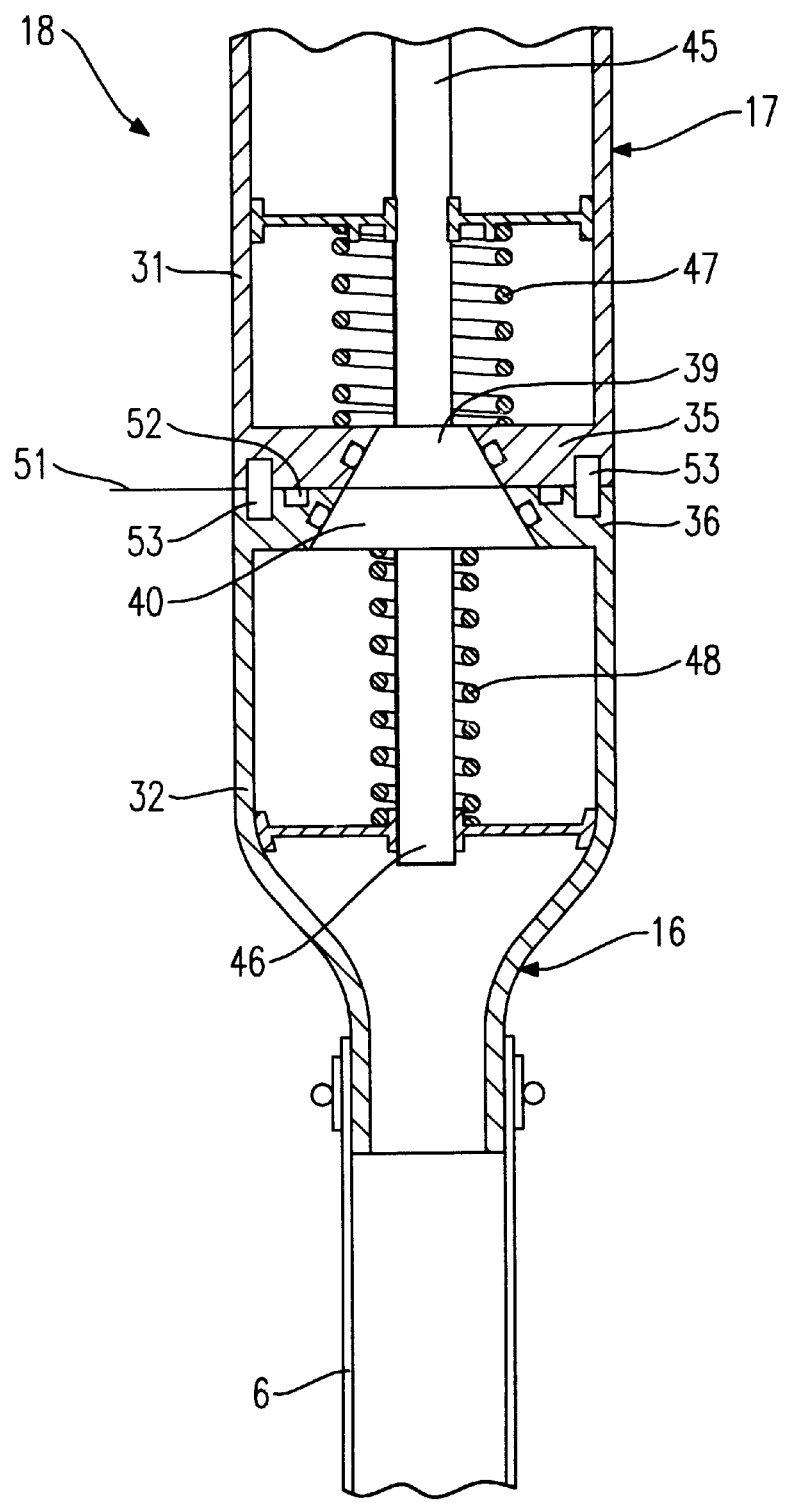
FIG. 3 shows a diagrammatic illustration of a coupling consisting of two coupling halves connecting to one another, in the closed state.
Figure 4:
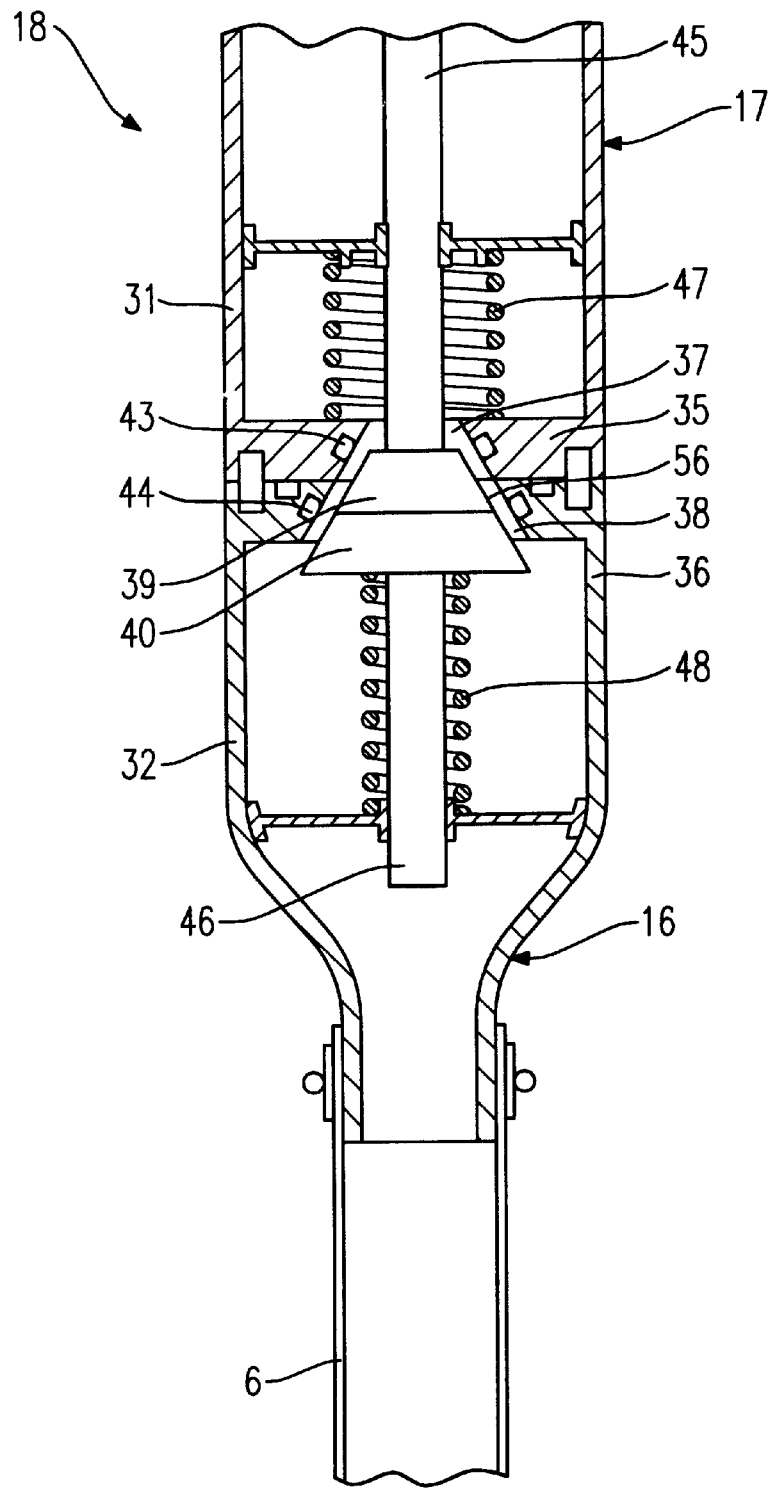
FIG. 4 shows an illustration of the coupling, as in FIG. 3, in the open state.
Figure 5:
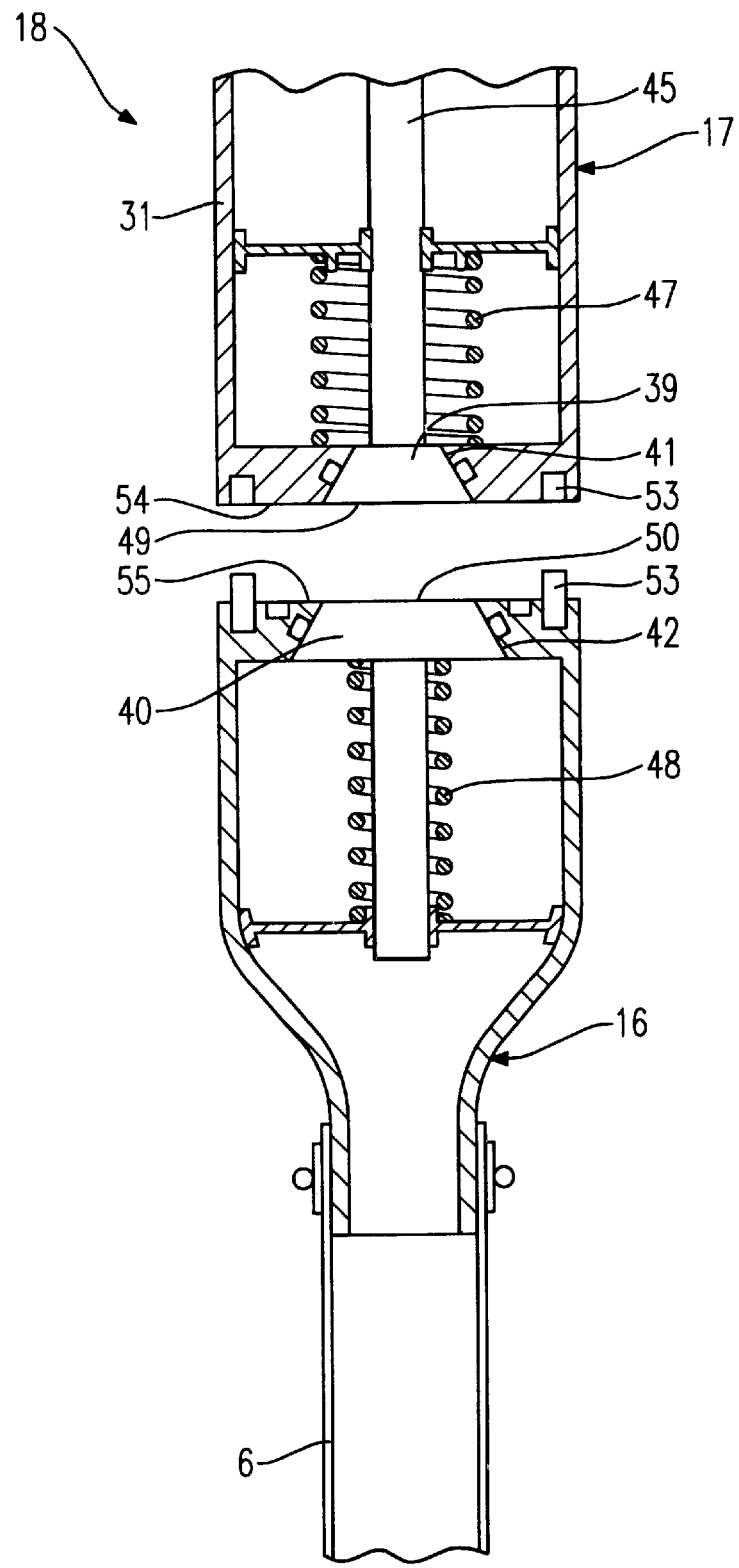
FIG. 5 shows an illustration, as in FIGS. 3 and 4, the two coupling halves in each case being closed and separated from one another.

The construction and functioning of the two couplings 18 and 19 are illustrated in FIGS. 3 to 5 by the example of the coupling 18.

Figure 7:
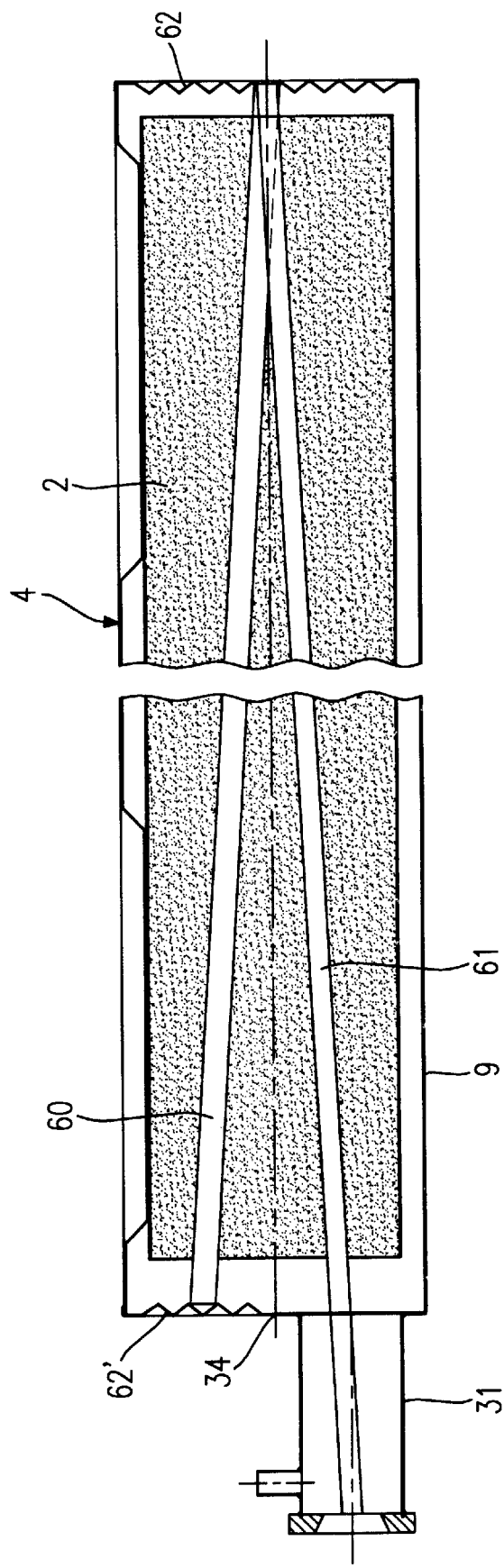
FIG. 7 shows a diagrammatic illustration with essential parts of the adsorber on a smaller scale and in section.

Each of the two coupling halves 16 and 17 of the coupling 18 has a housing part 31 and 32 which merge directly, in a way which is not relevant here, respectively into the line 6 and into a line section 33 leading to the adsorber 4 or directly into an end wall 34 of the vessel 9 containing the adsorption agent 2 (FIG. 7). The same also basically applies correspondingly to the second coupling 19.

Each coupling 18, 19 is configured in such a way that the components belonging to the two coupling halves 16 and 17 can be connected to one another and released from one another in a pressure-tight manner and with air being shut off. For this purpose, each coupling half 16 or 17 has an end wall 35 or 36, with which the coupling halves 16 and 17 come to bear on one another over a large area and positively. Located in each end wall 35 or 36 is a passage orifice 37 or 38 which can be closed with the aid of a closing body 39 or 40 in each case. So that the passage orifices 37 and 38 can be closed both in an air-tight and in a pressure-tight/vacuum-tight manner, the end walls 35 and 36 each have, as a boundary of the passage orifices 37 and 38, a valve-seat surface 41 or 42 for the closing bodies 39 and 40. Furthermore, seals 43 and 44 may be provided in the region of the valve-seat surfaces 41 and 42 (FIG. 4).

According to the exemplary embodiment, a valve stem 45 and 46 serves in each case as a carrier for the closing bodies 39 and 40. Moreover, a spring 47 and 48 in each case loads the closing bodies 39 and 40 indirectly or directly in the closing direction toward the valve-seat surfaces 41, 42.

According to the exemplary embodiment, the two closing bodies 39, 40 are frustoconical. In the closing position according to FIG. 3 and also in the opening position according to FIG. 4, the two closing bodies 39 and 40 come to bear with mutually confronting end faces 49, 50 (FIG. 5) on one another over the entire area and positively. Also, according to the exemplary embodiment, the two closing bodies 39 and 40 jointly have a frustoconical contour, one closing body 39 forming the tapering end and the other closing body 40 forming the wider end of the joint frustoconical contour. The two mutually confronting end faces 49 and 50 of the closing bodies 39 and 40 are expediently identical.

In the closed state, the closing bodies 39 and 40 rest with their end faces 49 and 50 in the separating surface 51 of the coupling 18 or of the two coupling halves 16 and 17 (FIG. 3). The separating surface 51 is expediently a plane and may be a plane circular surface. The separating surface 51 is expediently also completely plane in the region of the two end walls 35 and 36, as illustrated in FIGS. 3 to 5. In order to achieve a connection of the coupling halves 16 and 17 with air being shut off, so that surrounding air cannot pass into the interior of the lines or components when the coupling halves 16 and 17 are connected, it is basically necessary only that, in the closing position, the closing bodies 39 and 40 come to bear positively on one another and that those parts of the end walls 35 and 36 which are adjacent to the closing bodies radially outward come to bear positively on one another.

In the same way as seals 43 and 44 are assigned to the losing bodies 39 and 40, at least one of the two end walls 35 and 36 also has at least one seal 52.

Furthermore, at least one centering means 53 (FIG. 5) is provided, so that the two coupling halves 16 and 17 can be brought out of the opening or separating position according to FIG. 5 safely and reliably into the closing position according to FIG. 3.

Finally, it also becomes clear from the illustration in FIG. 5 not only that the two springs 47 and 48 load the two closing bodies 39 and 40 in the closing direction, but that the spring 48 for the larger closing body 40 is a compression spring and the spring 47 for the smaller closing body 39 is likewise a compression spring. The selected design is such that the smaller closing body 39 is drawn onto its valve-seat surface 41 in order to achieve the closing position, while the larger closing body 40 is pressed onto its valve-seat surface 42 in order to achieve the closing position. The spring 47 for the smaller closing body 39 is supported on the end wall 35 and loads a guide disk which is arranged moveably in the housing part 31 and which is connected rigidly to the valve stem 45 of the smaller closing body 39.

By virtue of the configuration and arrangement of the closing bodies 39 and 40, the two coupling halves 16 and 17 in each case have integrated valves which have to be closed before the separation of the coupling halves 16 and 17 and which can be opened again after the connection of the coupling halves 16 and 17.

For opening the two valves or for moving the two closing bodies 39 and 40 out of the closing position according to FIG. 3 into the opening position according to FIG. 4, it is necessary only to move one valve stem, to be precise the valve stem 45, in the opening direction. For this purpose, the valve stem 45 is displaced axially counter to the force of the spring 47 and counter to the pressure force of the spring 48, with the result that the closing body 39 belonging to the valve stem 45 at the same time moves the other closing body 40 into the opening position. For closing, the spring 48 presses the closing body 40 into its closing position and the valve stem 45 draws the closing body 39 simultaneously into its closing position as a result of the pressure force of the spring 47, when the force acting on the valve stem 45 in the opening direction is canceled.

In principle, one or two tension springs may also replace the compression springs, with the design being changed accordingly. The configuration of the two coupling halves 16 and 17 is therefore not restricted to the exemplary embodiment actually illustrated, this also applying, in particular, to the configuration of the separating surface 51.

For the pressure-tight connection of the coupling halves 16 and 17, with air being shut off, so that no surrounding air can penetrate into the components, it is expedient if the mutually confronting surfaces 54 and 55 of the two coupling halves 16 and 17 are at least partially mirror-symmetrical identical or at least partially positively come to bear on one another or engage one into the other.

The one valve stem 45, at the end of which the small closing body 39 is arranged (FIG. 4), is sufficient to open the two closing bodies 39 and 40, with the coupling halves 16 and 17 connected (FIG. 3). In the open state, the two closing bodies 39, 40 release a frustoconical annular gap 56, through which water vapor can flow either to the adsorber 4 or from the adsorber 4 to the condenser 8 and water storage vessel 7.

In order to adjust the valve stem 45, a control rod 60 may be provided, which, according to the exemplary embodiment illustrated in FIG. 7, [sic]

In order to adjust the valve stem 45, a control rod 60 may be provided, which, according to the exemplary embodiment illustrated in FIG. 7, passes through the vessel 9 for the adsorption agent 2 and is connected to the valve stem 45. A further control rod 61 likewise passing through the vessel 9 may be connected to the corresponding valve stem of the coupling half 17 of the coupling 19 which is located in the line 13. According to the exemplary embodiment, the control rods 60 and 61 extend from one deformable end wall 62 of the vessel 9 as far as another likewise deformable end wall 62' and, if appropriate, pass through this. The control rod 61 serves for opening the "valve" belonging to the adsorber 4, in the coupling 18. Said control rod moves the closing bodies of this coupling. In order to achieve a movement of the control rod 61, the deformable end wall 62 of the adsorber 4 is moved. The second control rod 60 is pushed in the same way as the control rod 61. By means of said second control rod, pressure is exerted on the second likewise deformable end wall 62' of the adsorber. This movement, in turn, leads to an adjustment of a valve stem 72 which controls the "outlet valve" of the water storage vessel 7. For this purpose, contrary to the diagrammatic illustration in FIG. 1, the coupling 19 is located directly with its coupling half 17 on the water storage vessel 7.

In principle, the "valves" integrated into the two couplings 18 and 19 are opened and closed simultaneously.

Without the adsorption agent 2 in the vessel 9 being adversely affected, the closing body 39 in the coupling 18 can be moved into the opening position and into the closing position as a result of the deformation of the end wall 62.

Figure 8:
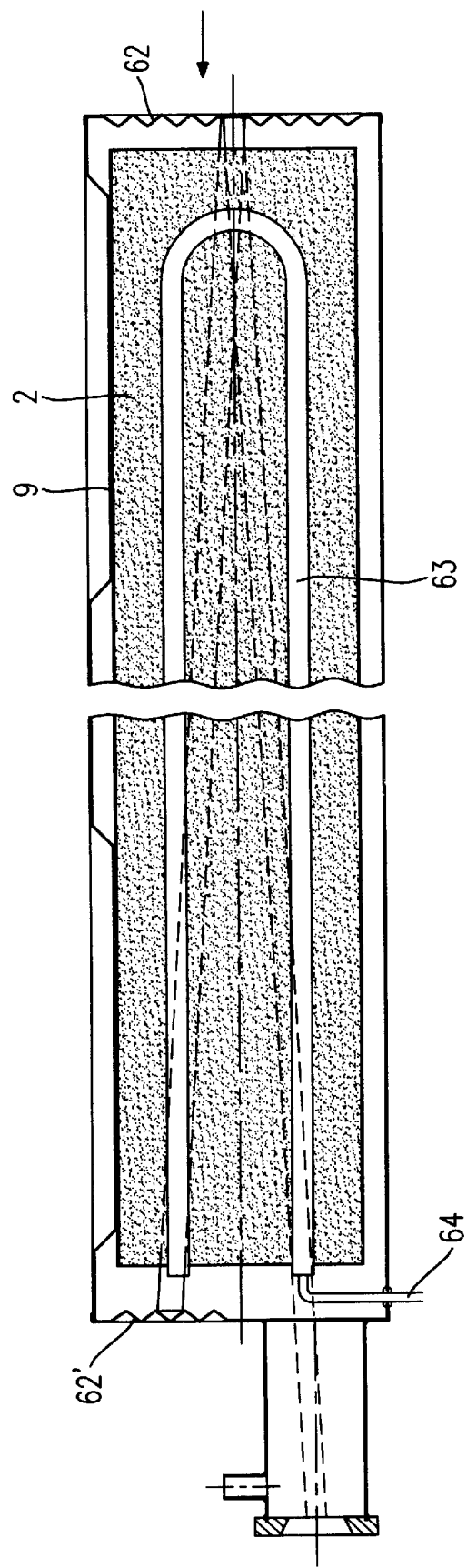
FIG. 8 shows an illustration, as in FIG. 7, in another plane.

Details of the heating system 24 indicated merely diagrammatically in FIG. 2 may be gathered from FIG. 8. This illustrates a heating coil 63 which is laid in the adsorption agent 2 and the electrical conductor 64 of which is led out of the vessel 9 at an appropriate point and is connected, for example, to the control device 25 according to FIG. 2.

Figure 6:
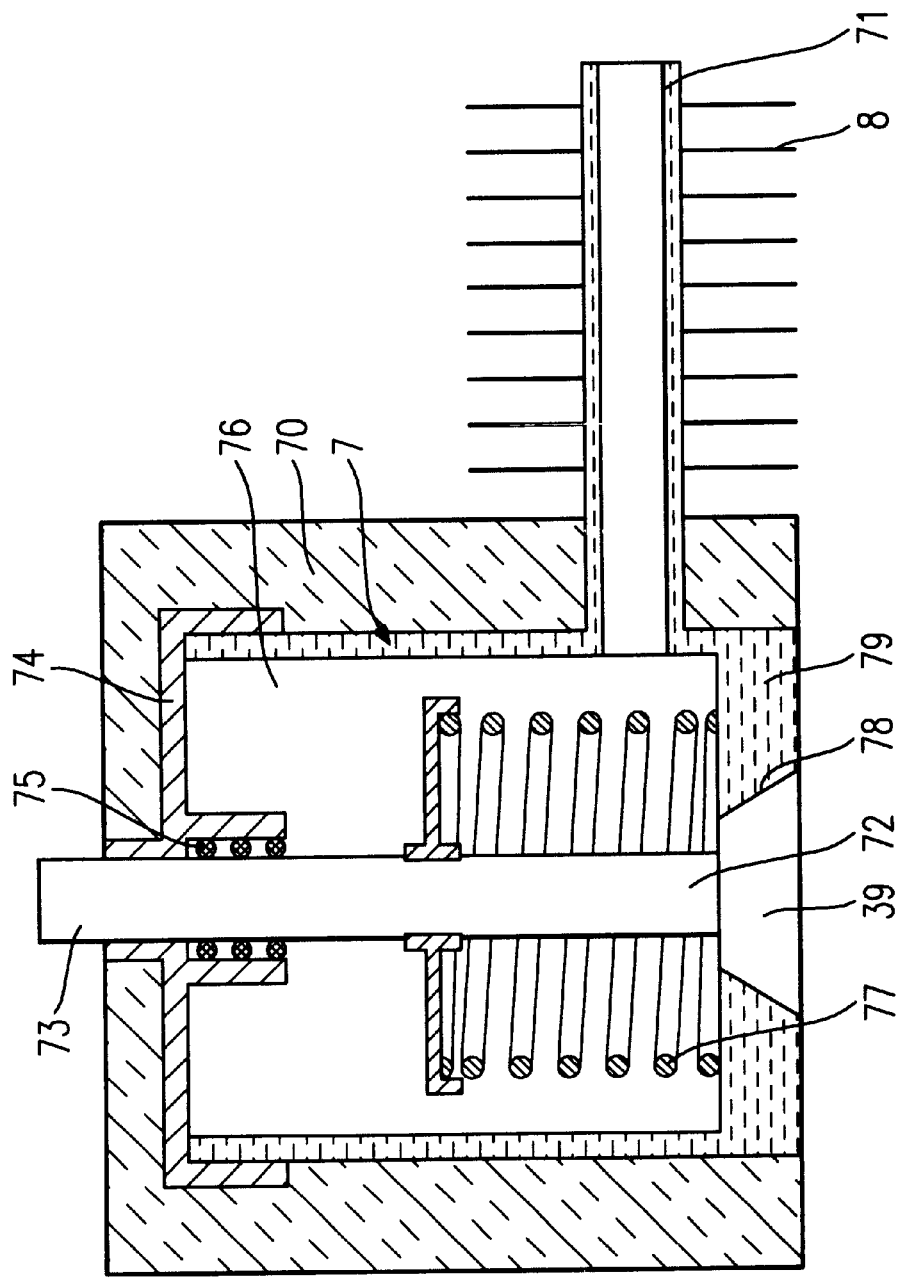
FIG. 6 shows a diagrammatic illustration of the water storage vessel in section.

According to a modified embodiment, the closing body 39 is integrated into the water storage vessel 7 (FIG. 6). Suitable insulation 70 surrounds the water storage vessel 7. A line section 71 connects the water storage vessel 7 to the reactor or adsorber 4. The closing body 39 is arranged at one end of a valve stem 72, the other end 73 of which is led out of the water storage vessel 7. The second end 73 is therefore freely accessible.

The valve stem 72 is guided in a cover 74. Sealing elements 75 seal off the interior 76 of the water storage vessel 7 relative to atmospheric pressure in the region of the leadthrough of the valve stem 72. The valve stem 72 in FIG. 6 corresponds to the valve stem 45 of FIG. 3.

Finally, the valve stem 72 is loaded with the aid of a compression spring 77, in such a way that the closing body 39 is drawn into the closing position. Under pressure on the free end 73 of the valve stem 72, the closing body 39 moves into the opening position, and at the same time it lifts off from a valve-seat surface 78 in an end wall 79 of the water storage vessel 7.

Figure 9:
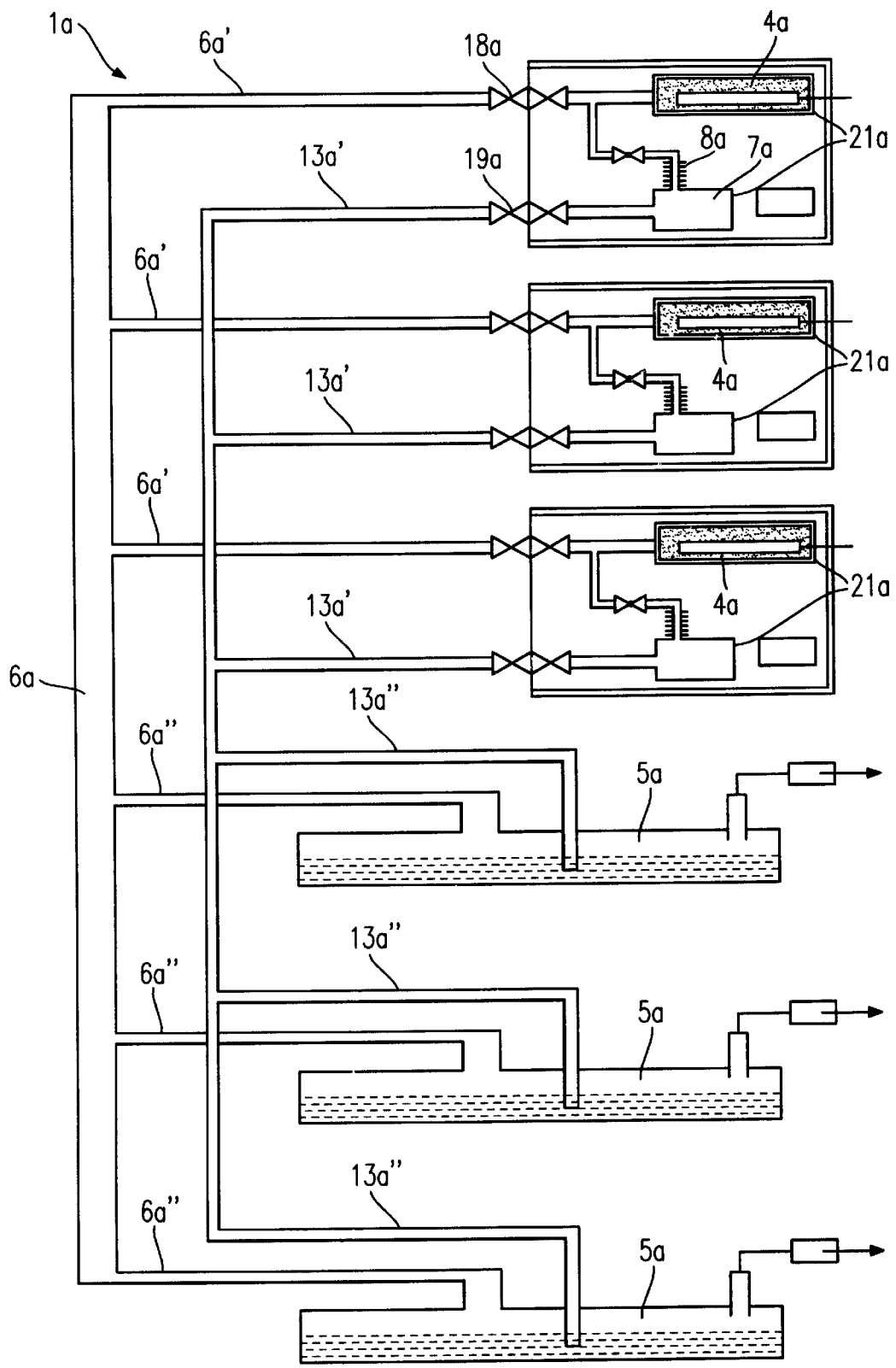
FIG. 9 shows a diagram with a plurality of evaporators and a plurality of adsorbers and also associated condensers, including water storage tanks.

An appliance 1 for cooling does not necessarily have to have a reactor or adsorber 4, an evaporator 5 or a water storage vessel 7 and a condenser 8 in a closed operating circuit, according to the exemplary embodiment illustrated in FIGS. 1 and 2, but an appliance 1a may also have, according to FIG. 9, a plurality of reactors or adsorbers 4a, a plurality of water storage vessels 7a with associated condensers 8a and a plurality of evaporators 5a in any desired number. Here, too, all the evaporators 5a are connected in each case to one of the reactors or adsorbers 4a via a main line 6a and branch lines 6a', supply lines 6a" leading from the evaporators 5a to the main line 6a. Likewise, the water storage vessels 7a with their condensers 8a are connected to the evaporators 5a via a main line 13a, supply lines 13a' leading from the water storage vessels 7a and the condensers 8a to the main line 13a and branch lines 13a" from the main line 13a to the evaporators 5a. Couplings 18a and 19a are located in each case in the branch lines 6a' and 13a" and in the supply lines 6a" and 13a'.

In each case a reactor or adsorber 4a, a water storage vessel 7a and the associated condenser 8a form an interconnected unit 21a or group which, in each case as unit 21a, may be coupled to the main lines 6a and 13a or separated from these with the aid of the couplings 18a and 19a.

The evaporators 5a also together form a unit or group which are connected jointly to the main lines 6a and 13a and take effect only ever jointly and simultaneously in the operating circuit.

The adsorbers 4a and the evaporators 5a and also the water storage vessels 7a and the condensers 8a in each case constitute components of the appliance 1a which are in each case connected to one another or separated from one another individually or as component groups in a pressure-tight manner and with air being shut off. Furthermore, the separation of the components means, in this case, that, after the separating operation, they are also physically removed from one another, so that the desorption operation can be carried out elsewhere.

Figure 10:
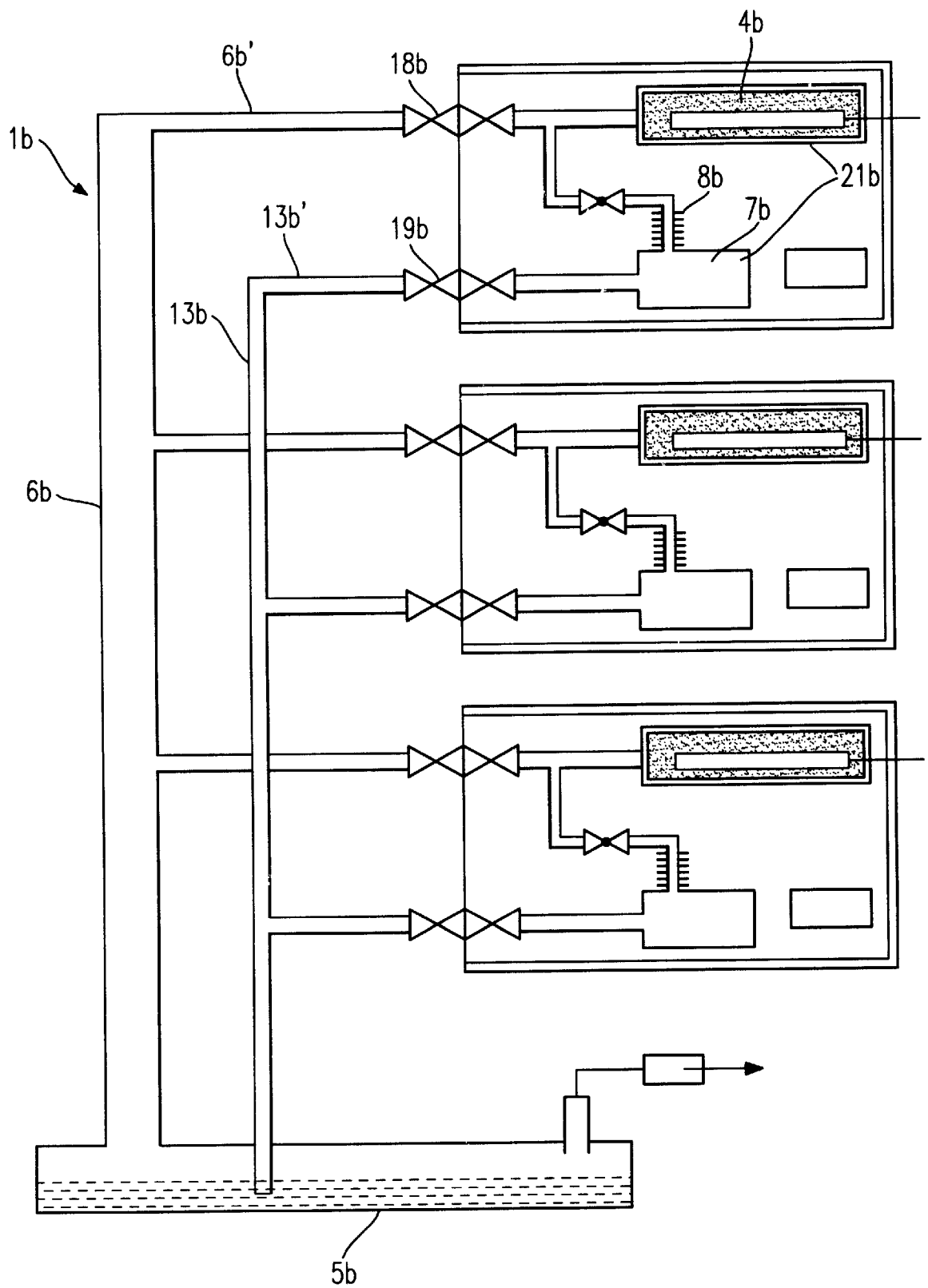
FIG. 10 shows a diagram with one evaporator and a plurality of adsorbers and also associated condensers and water storage tanks.

A final exemplary embodiment of an appliance 1b is illustrated in FIG. 10 and comprises an evaporator 5b, to which and from which a plurality of units 21b consisting of a reactor or adsorber 4b, a water storage vessel 7b and a condenser 8b can be connected for adsorption and separated for desorption via main lines 6b and 13b. Couplings 18b and 19b in the branch lines 6b' and in the supply lines 13b' also serve for this purpose. The components of the appliance 1b can therefore likewise be connected to one another and released from one another individually and/or in groups in a pressure-tight manner and with air being shut off.

The invention is not restricted to the exemplary embodiments illustrated essentially diagrammatically in the figures, but modifications are also possible, without departing from the idea of the invention. These also include, in particular, the fact that the shape and configuration of the valve disks or closing bodies 39 and 40 do not necessarily have to be frustoconical. Other configurations are also possible in principle, the decisive factor being that the coupling halves, together with their valves integrated in each, close in a manner free of dead space.

What is claimed is:

1. An appliance for cooling, with at least one reactor/adsorber (4) which comprises a vessel (9) for receiving an adsorption agent (2), in particular zeolite, with at least one vessel serving as an evaporator (5) and for receiving an evaporation agent (3), in particular water, and with at least one line (6) which connects the vessels and which is capable of being shut off at least with the aid of a shut-off member, the reactor/adsorber (4) and the evaporator (5) each having at least one orifice (10, 15) and being connectable to a vacuum generator (20) and to at least one condenser (8), and the reactor/adsorber (4), the evaporator (5) and the condenser (8) forming components of the appliance (1) which are connected to one another, wherein the components can be selectively connected to one another and released from one another individually and/or in groups in a pressure-tight manner and with air being shut off.

2. The appliance as claimed in claim 1, wherein
  a) the reactor/adsorber (4) and the condenser (8) and, if appropriate, a water storage vessel (7), on the one hand, form a unit (21), and
  b) the evaporator (5), on the other hand, forms a unit, and
  c) they can be connected releasably to one another.

3. The appliance as claimed in claim 1, wherein couplings (18, 19) free of dead space are provided for connecting and separating the components and/or component groups.

4. The appliance as claimed in claim 1, wherein at least one coupling (18, 19) is provided for selectively separating and connecting the components, and wherein the coupling (18, 19) comprises two coupling halves (16, 17) having mutually confronting surfaces (54, 55) that are at least partially mirror-symmetrically identical to an extent sufficient to establish a seal therebetween for connecting the components in the pressure-tight manner with air being shut off.

5. The appliance as claimed in claim 4, wherein the mutually confronting surfaces (54, 55) of the coupling halves (16, 17) and/or mutually confronting end faces (49, 50) of closing bodies (39, 40) of the coupling halves (16, 17) are in each case at least partially positive-locking with each other to an extent sufficient to maintain the seal therebetween for maintaining a condition of the components being connected in the pressure-tight manner with air being shut off.

6. The appliance as claimed in claim 4, wherein each coupling half (16, 17) has a passage orifice (37, 38) and a closing body (39, 40).

7. The appliance as claimed in claim 6, wherein each closing body (39, 40) is loaded in the closing direction by a spring (47, 48).

8. The appliance as claimed in claim 6, wherein the closing bodies (39, 40) are each frustoconical.

9. The appliance as claimed in claim 6, wherein, in the closing position, the two closing bodies (39, 40) together have a frustoconical contour.

10. The appliance as claimed in claim 6, wherein, in the closing position, the closing bodies (39, 40) of the two coupling halves (16, 17) come to bear with end faces (49, 50) on one another.

11. The appliance as claimed in claim 6, wherein the two closing bodies (39, 40) are jointly movable.

12. The appliance as claimed in claim 6, wherein a valve stem (45, 46) is assigned to at least one of the two closing bodies (39, 40).

13. The appliance as claimed in claim 6, wherein, during opening, one closing body (40) can be moved into the opening position with the aid of the other closing body (39).

14. The appliance as claimed in claim 6, wherein one valve stem (45) is provided for moving the two closing bodies (39, 40) in the opening direction.

15. The appliance as claimed in claim 14, wherein the valve stem (45) serving for opening the closing bodies (39, 40) is connected to a control rod (60) which passes through at least one of the components.

16. A method for cooling, using an adsorption agent, and with at least one reactor/adsorber (4) which comprises a vessel (9) for receiving the adsorption agent (2), in particular zeolite, with at least one vessel serving as an evaporator (5) and for receiving an evaporation agent (3), in particular water, and with at least one line (6) which connects the two vessels and which is capable of being shut off at least with the aid of a shut-off member, the reactor/adsorber (4) and the evaporator (5) in each case having at least one orifice (10, 15) and being connectable to a vacuum generator (20) and to at least one condenser (8), wherein a separation of individual components and/or of component groups for regenerating the adsorption agent and a connection of individual components and/or component groups for a new adsorption cycle respectively take place in each case in a pressure-tight manner and with air being shut off.

17. The method as claimed in claim 16, wherein the reactor/adsorber (4), together with the condenser (8), and, if appropriate, with a water storage vessel (7) connected to the condenser (8) is separated from the evaporator (5) for desorption and is connected again for adsorption.

18. A method for cooling, using an adsorption agent, and with at least one reactor/adsorber (4) which comprises a vessel (9) for receiving the adsorption agent (2), in particular zeolite, with at least one vessel serving as an evaporator (5) and for receiving an evaporation agent (3), in particular water, and with at least one line (6) which connects the two vessels and which is capable of being shut off at least with the aid of a shut-off member, the reactor/adsorber (4) and the evaporator (5) each having at least one orifice (10, 15) and being connectable to a vacuum generator (20) and to at least one condenser (8), defined by a process control such that a vacuum prevails in the condenser (8) at least at the commencement of desorption.

* * * * *